US009862432B2

(12) United States Patent
Lee (10) Patent No.: US 9,862,432 B2
(45) Date of Patent: Jan. 9, 2018

(54) CAB TILTING STAY EASY-UNLOCK SYSTEM FOR AUTOMOBILE

(71) Applicant: Hyundai Motor Company, Seoul (KR)

(72) Inventor: KwangRae Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/140,017

(22) Filed: Apr. 27, 2016

(65) Prior Publication Data

US 2017/0158255 A1 Jun. 8, 2017

(30) Foreign Application Priority Data

Dec. 4, 2015 (KR) .......................... 10-2015-0172481

(51) Int. Cl.
*B62D 33/07* (2006.01)
(52) U.S. Cl.
CPC .................................... *B62D 33/07* (2013.01)
(58) Field of Classification Search
CPC ....................................................... B62D 33/07
USPC ....................................... 296/190.05–190.07
See application file for complete search history.

(56) References Cited

U.S. PATENT DOCUMENTS

| 4,438,826 A * | 3/1984 | Bewers ................. | B62D 33/07 |
| | | | 180/89.14 |
| 6,637,531 B2 * | 10/2003 | Palenchar ............. | B62D 25/10 |
| | | | 180/69.21 |
| 8,408,637 B1 * | 4/2013 | Dilts ..................... | B62D 33/07 |
| | | | 180/89.16 |
| 9,580,116 B1 * | 2/2017 | Kwon .................... | B62D 33/071 |
| 2004/0182617 A1 * | 9/2004 | Sanderson ............ | B62D 33/07 |
| | | | 180/69.21 |
| 2014/0103183 A1 * | 4/2014 | Lokhande .............. | B62D 33/07 |
| | | | 248/352 |

FOREIGN PATENT DOCUMENTS

| JP | 2008-62684 | * 3/2008 | ............ B62D 33/07 |
| KR | 10-2002-0040271 A | 5/2002 | |
| KR | 10-2007-0079800 A | 8/2007 | |
| KR | 10-0774339 B1 | 11/2007 | |

* cited by examiner

*Primary Examiner* — Gregory Blankenship
(74) *Attorney, Agent, or Firm* — Mintz Levin Cohn Ferris Glovsky and Popeo, P.C.; Peter F. Corless (57) ABSTRACT

A cab tilting stay easy-unlock system includes: a tilting stay portion including an upper stay rod rotatably combined with a vehicle cab, a lower stay rod rotatably combined on an axis to the upper stay rod and rotatably combined with the vehicle body, and a locking handle provided at the upper stay rod and that fixes or unfixes the upper stay rod and the lower stay rod by being combined with the lower stay rod; and a tilting handle portion connected to the tilting stay portion by a cable and operating the tilting stay portion to be in a folded state.

14 Claims, 12 Drawing Sheets

CAB TILTING STAY EASY-UNLOCK SYSTEM FOR AUTOMOBILE

CROSS-REFERENCE TO RELATED APPLICATION

This application claims under 35 U.S.C. §119(a) the benefit of Korean Patent Application No. 10-2015-0172481 filed in the Korean Intellectual Property Office on Dec. 4, 2015, the entire contents of which are incorporated herein by reference.

BACKGROUND (a) Field of the Invention

The present invention relates to a cab tilting stay easy-unlock system for a vehicle.

(b) Description of the Related Art

Vehicles, particularly trucks, have a cab, and the cab of the truck is opened for inspection and maintenance of an engine, a chassis, and other components. At this time, the cab is maintained in a tilted state at a predetermined angle.

After the inspection and maintenance, the cab is returned to its original position. Generally, the cab is unlocked and goes down by entering into the lower part of the cab by pulling handles of the cab by hand.

In case of commercial vehicles, the cab is tilted regularly for daily inspections, and when returning the cab to its original location after inspection, incidents such as pinching, jamming, and projecting of the body may occur.

The above information disclosed in this Background section is only for enhancement of understanding of the background of the invention and therefore it may contain information that does not form the prior art that is already known in this country to a person of ordinary skill in the art.

SUMMARY

The present invention provides a cab tilting stay easy-unlock system for a vehicle in which unlocking of a tilting stay portion is possible only by operating a tilting handle portion connected to a cable to solve the problems of pinching, jamming, and projecting of a body that may occur using existing technology.

A cab tilting stay easy-unlock system according to an exemplary embodiment of the present invention includes: a tilting stay portion including an upper stay rod rotatably combined with a vehicle cab, a lower stay rod rotatably combined on an axis to the upper stay rod and rotatably combined with the vehicle body, and a locking handle provided at the upper stay rod and that fixes or unfixes the upper stay rod and the lower stay rod by being combined with the lower stay rod; and a tilting handle portion connected to the tilting stay portion by a cable and operating the tilting stay portion to be in a folded state.

An end portion of the upper stay rod the upper may be fixed to the lower portion of the vehicle cab by an upper bracket.

The upper bracket may include a pulley that rotates so that the cable is wound.

An end portion of the lower stay rod may be fixed to the vehicle body by a lower bracket.

At the lower stay rod, a locking stopper combined with or separated from a locking opening of the upper stay rod to fix or unfix the upper stay rod and the lower stay rod may be provided.

The locking stopper may be provided in the side portion of the lower stay rod and include a spring inside of the locking stopper so that the locking stopper moves along the side portion of the lower stay rod.

The tilting handle portion may be provided on the side portion of the vehicle cab.

The tilting handle portion may include an unlock handle that is connected to and moves the cable, and a spring providing restoring force to the unlock handle.

The locking handle may be connected to the cable and rotate while pulling the cable.

The locking handle may be separated from the lower stay rod by pulling the unlock handle toward the spring.

The locking handle may push the locking stopper by pulling the unlock handle toward the spring.

According to an exemplary embodiment of the present invention, a role of a locking handle which is not used because of discomfort during regular daily inspection may be maximized, and discomfort of users may be minimized, such that usability may be improved.

Also, the problem of pinching, jamming, and projecting of the body occurring by the existing technology when returning to a driving mode after cab tilting may be mostly solved by removing the number of direct accesses by users.

DETAILED DESCRIPTION OF THE EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, a first exemplary embodiment is representatively described, and in other exemplary embodiments, only a configuration different from the first exemplary embodiment will be described.

It shall be noted that the drawings are schematic and do not depict exact dimensions. The relative proportions and ratios of elements in the drawings may be exaggerated or diminished in size for the sake of clarity and convenience in the drawings, and such arbitrary proportions are only illustrative and are not limiting in any way. Like reference numerals are used for like structures, elements, or parts shown in two or more drawings to show similar characteristics. When one part is said to be "over" or "on" another part, the one part may be directly over or on the other part or there may be another part interposed therebetween.

Exemplary embodiments of the present invention specifically show preferred exemplary embodiments of the present invention. As a result, various modifications of the drawings are anticipated. Therefore, the exemplary embodiments are not limited to a specific form of an illustrated region, and, for example, include modifications of a manufactured form.

Hereinafter, a cab tilting stay easy-unlock system for a vehicle according to an exemplary embodiment of the present invention will be described with reference to FIG. 1 to FIG. 4.

Figure 1:
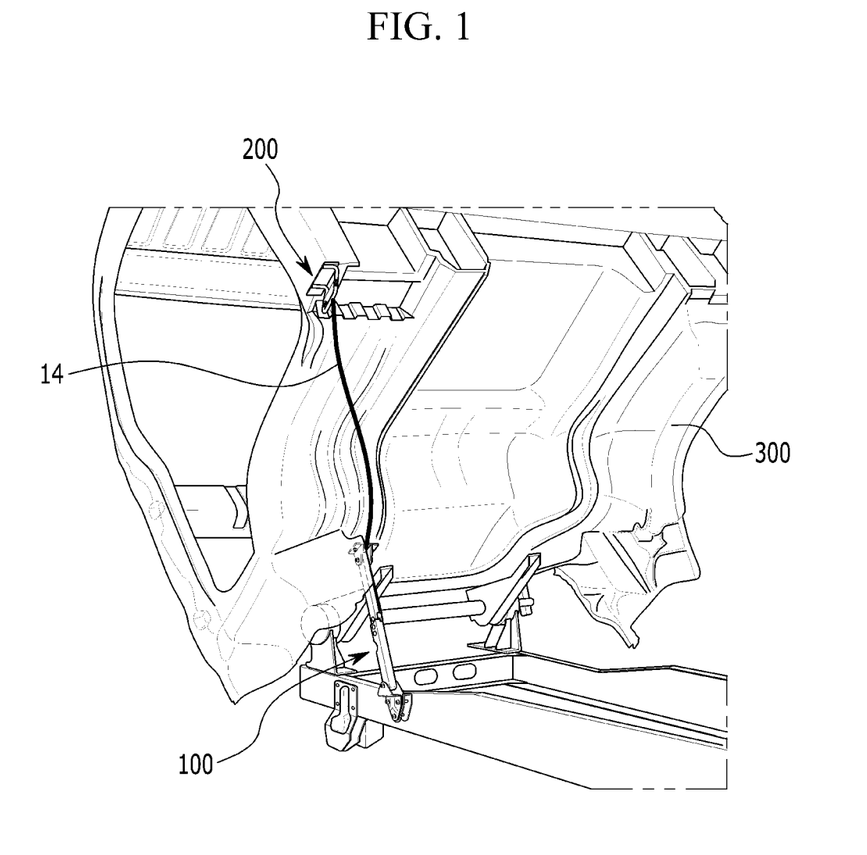
FIG. 1 is a schematic drawing of a cab tilting stay easy-unlock system provided in a vehicle cab and body.
Figure 2:
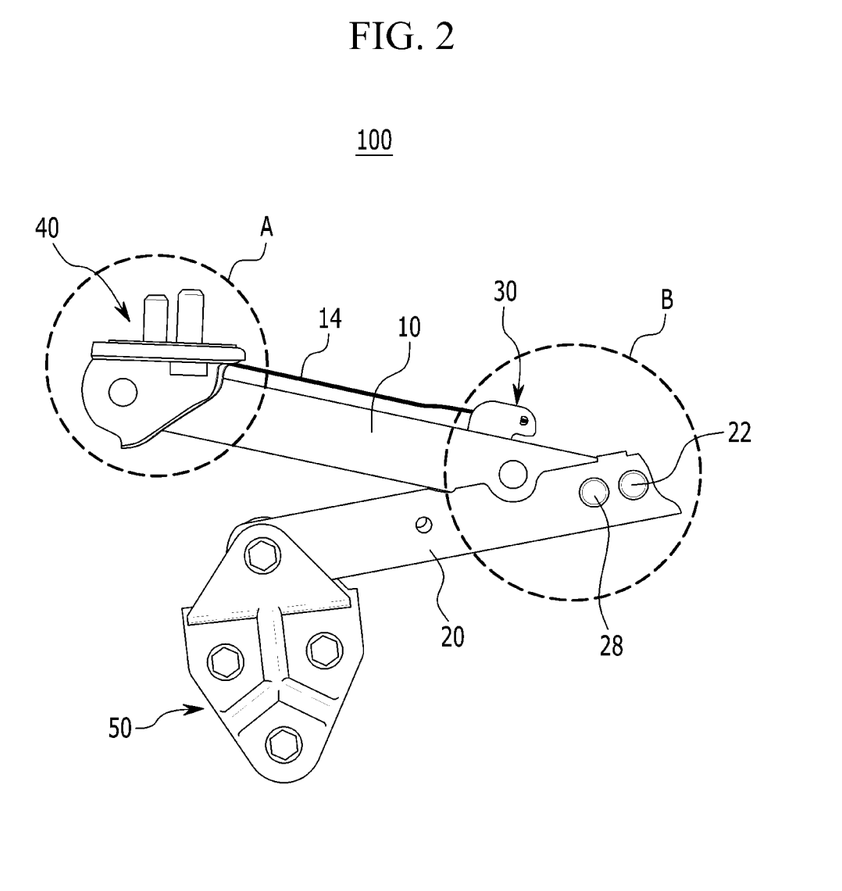
FIGS. 2 and 3 are schematic drawings of a tilting stay portion according to an exemplary embodiment of the present invention.
Figure 3:
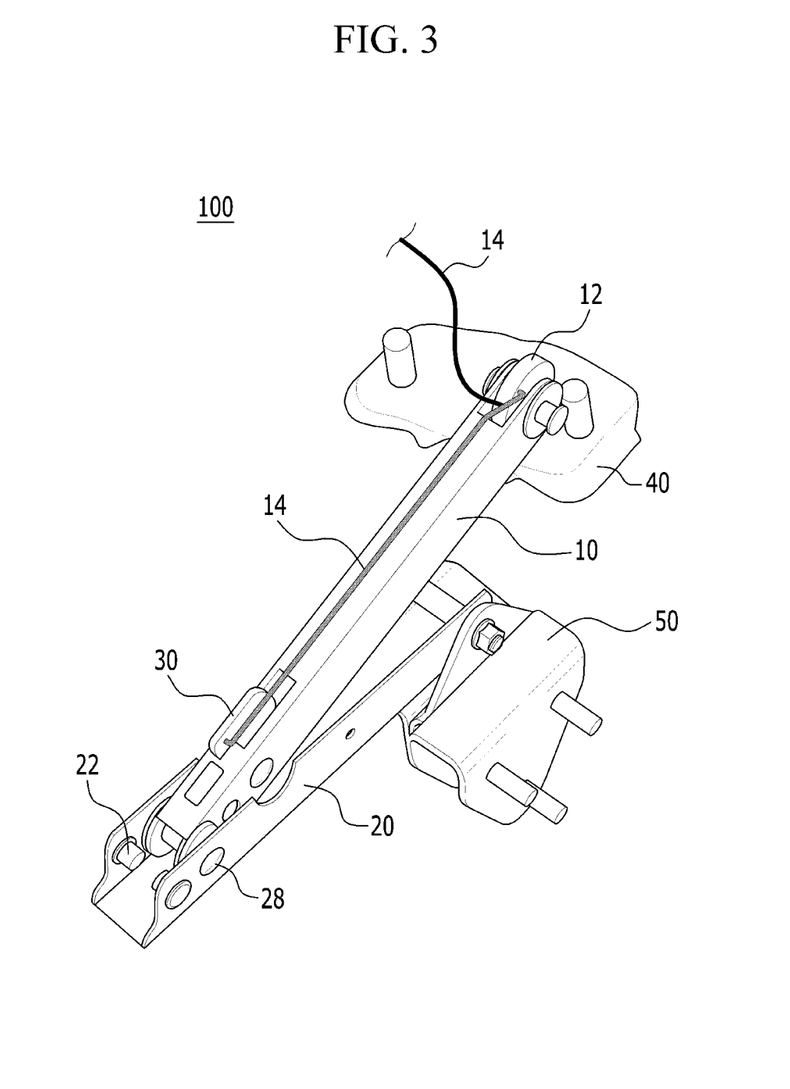
Figure 4:
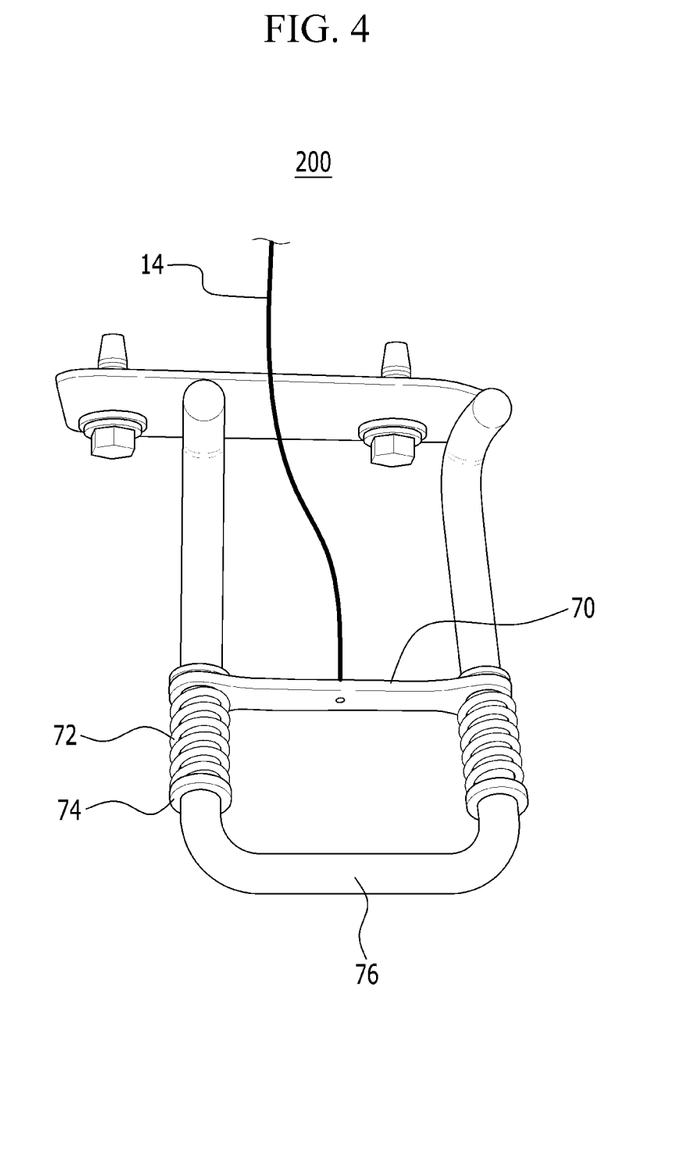
FIG. 4 is a schematic drawing of a tilting handle portion according to an exemplary embodiment of the present invention.

FIG. 1 is a schematic drawing of a cab tilting stay easy-unlock system provided in a vehicle cab and vehicle body, FIGS. 2 and 3 are schematic drawings of a tilting stay portion according to an exemplary embodiment of the present invention, and FIG. 4 is a schematic drawing of a tilting handle portion according to an exemplary embodiment of the present invention.

Referring to FIG. 1, a cab tilting stay easy-unlock system according to an exemplary embodiment of the present invention includes a tilting stay portion 100 and a tilting handle portion 200. The tilting handle portion 200 is provided at the side portion of a vehicle cab 300, and the tilting stay portion 100 includes an upper stay rod 10 and a lower stay rod 20. The upper stay rod 10 is rotatably combined with the lower side of the vehicle cab 300, and the lower stay rod 20 is rotatably combined with the vehicle body.

The tilting stay portion 100 and the tilting handle portion 200 are connected each other by a cable 14, and the tilting stay portion 100 may be changed to be in a folded state by operating the tilting handle portion 200 and pulling the cable 14 toward the vehicle cab 300.

Referring to FIGS. 2-3, the tilting stay portion 100 includes the upper stay rod 10 rotatably combined with the vehicle cab 300 and the lower stay rod 20 rotatably combined on an axis to the upper stay rod 10. The upper stay rod 10 and the lower stay rod 20 are connected by a connection pin 28 and rotate with respect to each other around the pin 28.

An end portion of the upper stay rod 10 may be fixed to the lower part of the vehicle cab 300 by an upper bracket 40. The upper bracket 40 may include a pulley 12 rotating so that the cable 14 is wound. The cable 14 wound around the pulley 12 is connected to the tilting handle portion 200.

An end portion of the lower stay rod 20 is fixed to the vehicle body by a lower bracket 50. The lower stay rod 20 is rotatably combined with the lower bracket 50, and the lower stay rod 20 rotates at the lower bracket 50 when the tilting stay portion 100 is straightened or folded.

Meanwhile, a locking handle 30 may be provided at the upper stay rod 10. The cable 14 wound around the pulley 12 is connected to the locking handle 30, and the locking handle 30 rotates on an axis when the pulley 12 rotates. The locking handle 30 is combined with the lower stay rod 20, and fixes the upper stay rod 10 and the lower stay rod 20 in a straight state. Further, the upper stay rod 10 and the lower stay rod 20 may be changed to be in a folded state by operating the tilting handle portion 200 and separating the locking handle 30 from the lower stay rod 20.

Referring to FIG. 4, the tilting handle portion 200 includes an unlock handle 70 and a spring 72. The tilting handle portion 200 includes a grip portion 76 having 'U' shape and a projection 74 formed at the grip portion 76. The cable 14 is connected to the unlock handle 70, and the cable 14 is extended and wound to the pulley 12 of the upper stay rod 10. The spring 72 is provided between the projection 74 and the unlock handle 70, and provides restoring force to the unlock handle 70. When a user grasps the unlock handle 70 and the grip portion 76 together and compresses the spring 72, the cable 14 connected to the unlock handle 70 is pulled toward the grip portion 76.

Figure 5:
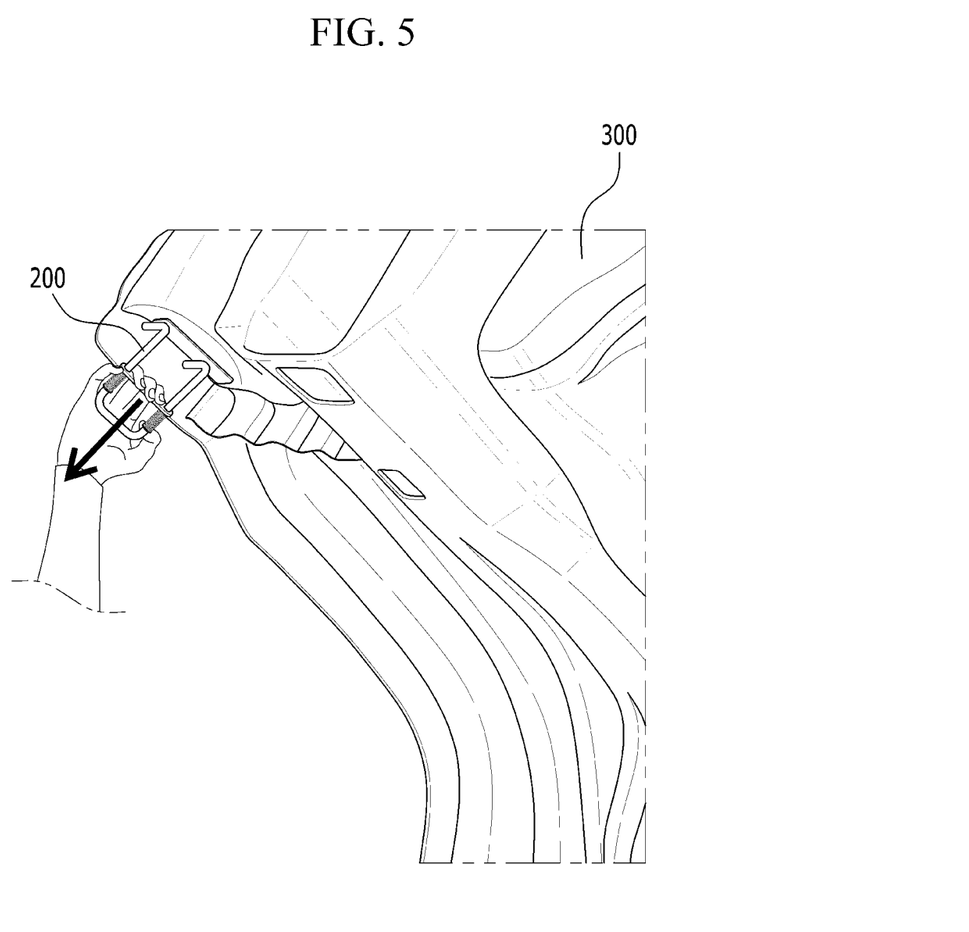
FIG. 5 is a schematic drawing illustrating a user pulling the tilting handle portion according to an exemplary embodiment of the present invention.

FIG. 5 is a schematic drawing illustrating a user pulling the tilting handle portion according to an exemplary embodiment of the present invention. As shown in FIG. 5, the tilting handle portion 200 is provided on the side portion of the vehicle cab 300, and a user can control the tilting handle portion 200 at the side of the vehicle cab 300 without the need to bend his or her body or hands between the vehicle body and the vehicle cab 300.

Figure 6:
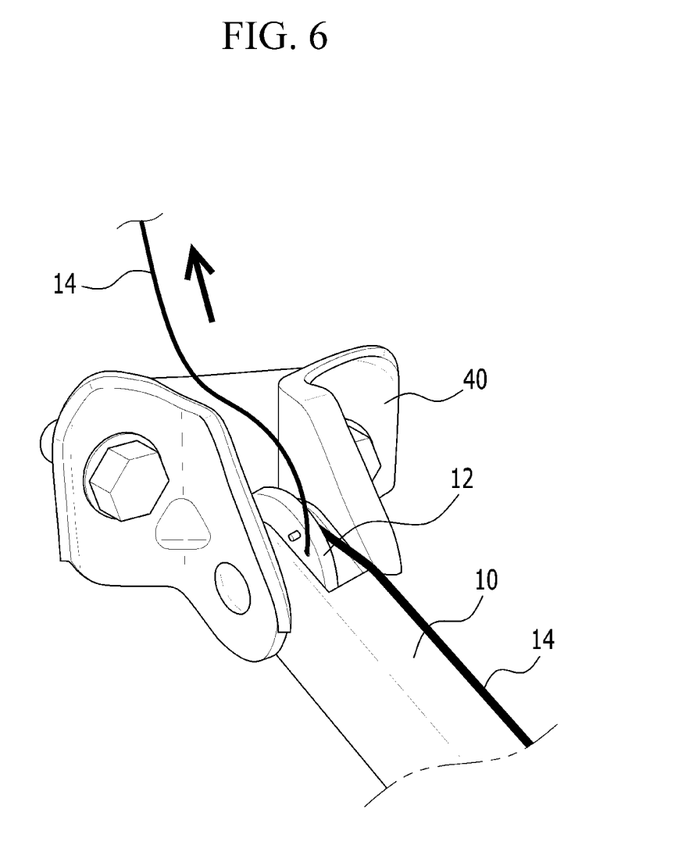
FIG. 6 is an enlarged view of part "A" of FIG. 2.

FIG. 6 is a drawing illustrating a part "A" of FIG. 2, and shows the upper bracket combined with the upper stay rod of the tilting stay portion according to an exemplary embodiment of the present invention. Referring to FIG. 6, the upper bracket 40 is provided at the end portion of the upper stay rod 10, and the upper bracket 40 is attached to the lower part of the vehicle cab 300. The upper bracket 40 and the upper stay rod 10 are rotatably combined with each other, and the pulley 12 rotating so that the cable 14 is wound is provided. The cable 14 is connected to the unlock handle 70 of the tilting handle portion 200, is wound around the pulley 12, and extends to the tilting stay portion 100 to be connected the locking handle 30.

Figure 7:
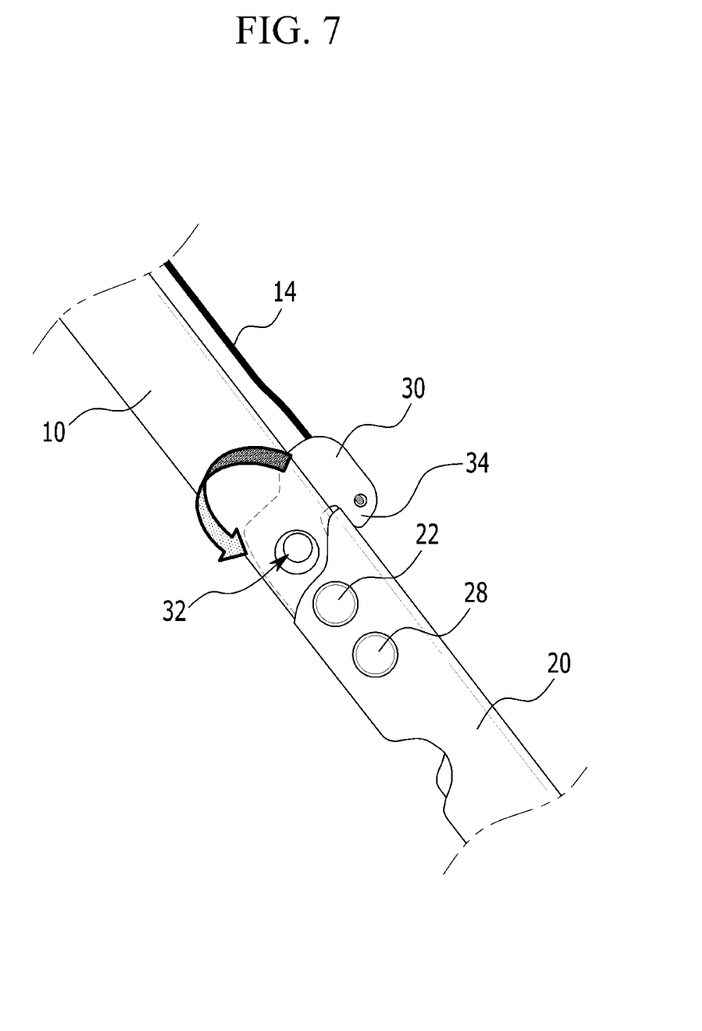
FIG. 7 is an enlarged view of part "B" of FIG. 2.
Figure 8:
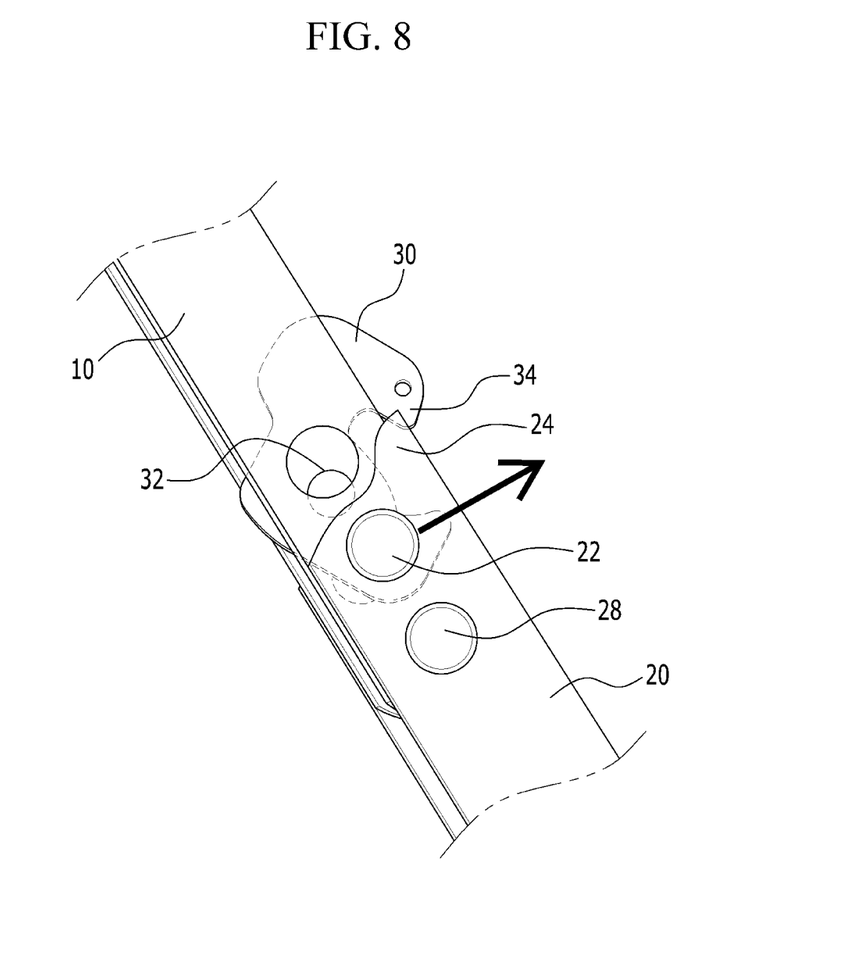
FIG. 8 is a schematic drawing illustrating an unlocking state of the tilting stay portion according to an exemplary embodiment of the present invention.
Figure 9:
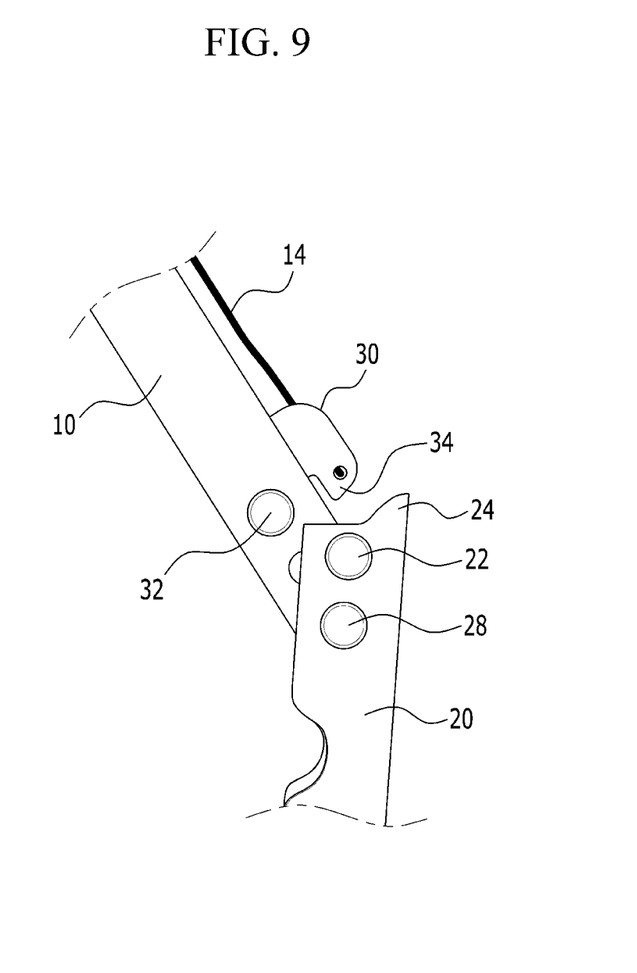
FIG. 9 is a schematic drawing illustrating an unlocked state of the tilting stay portion according to an exemplary embodiment of the present invention.

FIG. 7 is a drawing illustrating a part "B" of FIG. 2 and shows a locked state of the tilting stay portion according to an exemplary embodiment of the present invention, FIG. 8 is a schematic drawing illustrating an unlocking state of the tilting stay portion according to an exemplary embodiment of the present invention, and FIG. 9 is a schematic drawing illustrating an unlocked state of the tilting stay portion according to an exemplary embodiment of the present invention.

As shown in FIG. 7 and FIG. 8, when the tilting stay portion 100 is in a locked state, the upper stay rod 10 and the lower stay rod 20 are combined in a straight line, and a protrusion 34 of the locking handle 30 provided at the upper stay rod 10 is combined with a protrusion 24 of the lower stay rod 20. In this case, a locking stopper 22 provided at the lower stay rod 20 is inserted into a groove formed in the upper stay rod 10 to fix the upper stay rod 10 and the lower stay rod 20 together.

As shown in FIG. 8, when a user pulls the unlock handle 70 of the tilting handle portion 200, the cable 14 connected to the unlock handle 70 rotates the locking handle 30 to separate the locking handle 30 from the protrusion 24 of the lower stay rod 20. At the same time, the lower side of the locking handle 30 pushes the locking stopper 22 of the lower stay rod 20 to separate the locking stopper 22 from the groove formed in the upper stay rod 10.

When a user fully pulls the unlock handle 70, the locking handle 30 and the lower stay rod 20 are completely separated, and the locking stopper 22 is completely separated from the groove formed in the upper stay rod 10. As shown in FIG. 9, the upper stay rod 10 and the lower stay rod 20 that are rotatably combined by the connection pin 28 rotate around the connection pin to be in an unlocked state with a folded shape.

Figure 10:
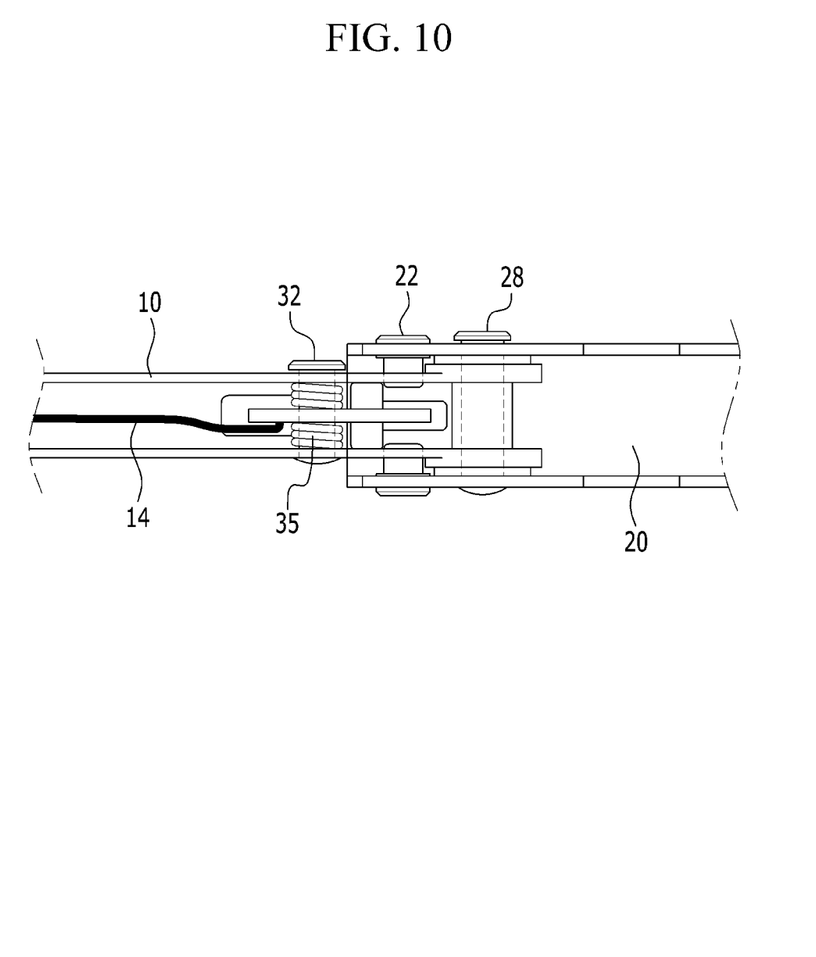
FIG. 10 is a schematic drawing illustrating a connection state of the upper stay rod and the lower stay rod of the tilting stay portion according to an exemplary embodiment of the present invention.
Figure 11:
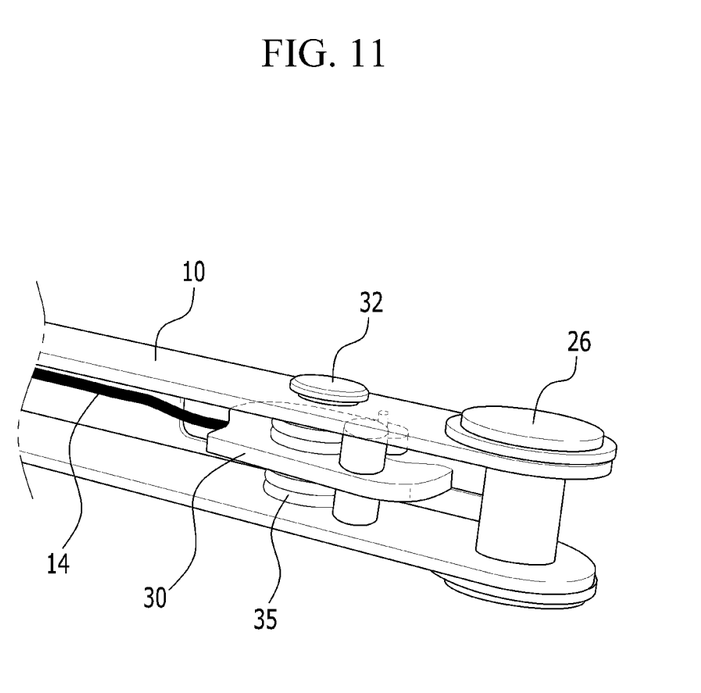
FIG. 11 is a schematic drawing illustrating an upper stay rod of the tilting stay portion according to an exemplary embodiment of the present invention.
Figure 12:
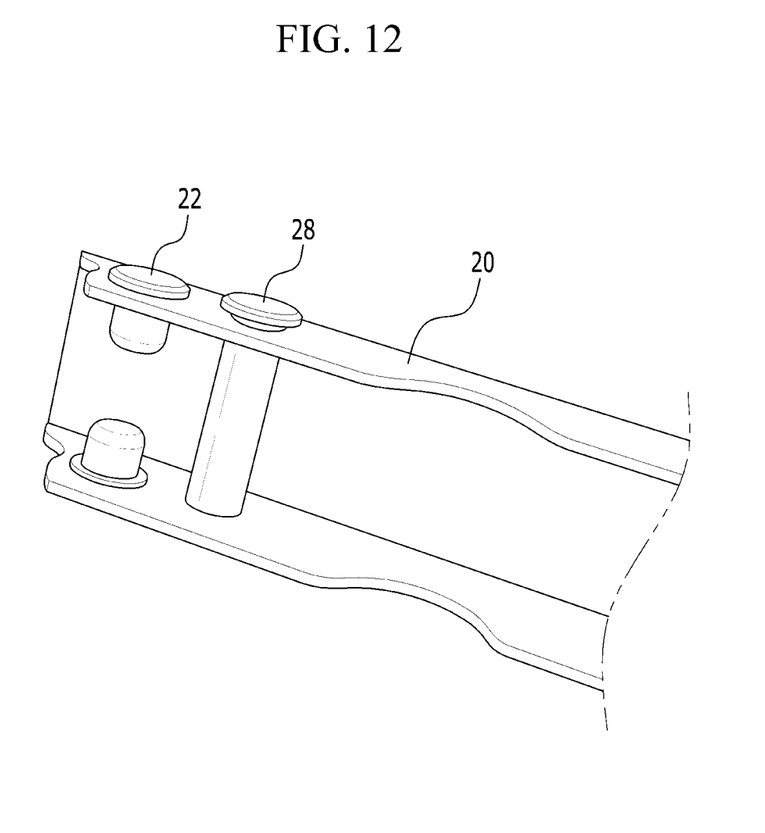
FIG. 12 is a schematic drawing illustrating a lower stay rod of the tilting stay portion according to an exemplary embodiment of the present invention.

FIG. 10 is a schematic drawing illustrating a connection state of the upper stay rod and the lower stay rod of the tilting stay portion according to an exemplary embodiment of the present invention, FIG. 11 is a schematic drawing illustrating the upper stay rod of the tilting stay portion according to an exemplary embodiment of the present invention, and FIG. 12 is a schematic drawing illustrating the lower stay rod of the tilting stay portion according to an exemplary embodiment of the present invention.

Referring to FIGS. 10-12, the upper stay rod 10 and the lower stay rod 20 are rotatably connected by the connection pin 28, and the locking handle 30 rotates around a rotation axis 32 at the inside of the upper stay rod 10. Restoring force is provided to the rotation axis 32 by a spring 35 to rotate the locking handle 30. The cable 14 is connected to the locking handle 30, and the locking handle 30 rotates around the rotation axis 32 by pulling the cable 14 to be separated from the lower stay rod 20.

The locking handle 30 is provided at the inside of the upper stay rod 10, and a connection hole 26 is formed at the upper stay rod 10. The connection pin 28 is inserted into the connection hole 26 of the upper stay rod 10, therefore the upper stay rod 10 and the lower stay rod 20 are rotatably combined.

As described, the cab tilting stay easy-unlock system according to an exemplary embodiment of the present invention enables unlocking of the tilting stay portion by operating the tilting handle portion connected to the cable to completely eliminate user action between the vehicle cab and the vehicle body and solve the problems of pinching, jamming, and projecting of the body.

Further, a role of a locking handle which is not used because of discomfort during regular daily inspection may be maximized, and discomfort of users may be minimized, such that usability may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A cab tilting stay easy-unlock system, the system comprising:
    a tilting stay portion including an upper stay rod rotatably combined with a vehicle cab, a lower stay rod rotatably combined on an axis to the upper stay rod and rotatably combined with the vehicle body, and a locking handle provided at the upper stay rod and that fixes or unfixes the upper stay rod and the lower stay rod by being combined with the lower stay rod;
    a tilting handle portion connected to the tilting stay portion by a cable and operating the tilting stay portion to be in a folded state; and
    a locking stopper arranged in the lower stay rod that is combined with or separated from a locking opening of the upper stay rod to fix or unfix the upper stay rod and the lower stay rod.

2. The system of claim 1, wherein an end portion of the upper stay rod is fixed to the lower portion of the vehicle cab by an upper bracket.

3. The system of claim 2, wherein the upper bracket includes a pulley that rotates so that the cable is wound.

4. The system of claim 1, wherein an end portion of the lower stay rod is fixed to the vehicle body by a lower bracket.

5. The system of claim 1 wherein the locking stopper is provided in a side portion of the lower stay rod and includes a spring inside of the locking stopper so that the locking stopper moves along the side portion of the lower stay rod.

6. The system of claim 1, wherein the tilting handle portion is provided on a side portion of the vehicle cab.

7. The system of claim 1, wherein the tilting handle portion includes an unlock handle that is connected to and moves the cable, and a spring providing restoring force to the unlock handle.

8. The system of claim 7, wherein the locking handle is connected to the cable and rotates while pulling the cable.

9. The system of claim 7, wherein the locking handle is separated from the lower stay rod by pulling the unlock handle toward the spring.

10. The system of claim 7, wherein the locking handle pushes a locking stopper by pulling the unlock handle toward the spring.

11. A cab tilting stay easy-unlock system, the system comprising:
   a tilting stay portion including an upper stay rod rotatably combined with a vehicle cab, a lower stay rod rotatably combined on an axis to the upper stay rod and rotatably combined with the vehicle body, and a locking handle provided at the upper stay rod and that fixes or unfixes the upper stay rod and the lower stay rod by being combined with the lower stay rod; and
   a tilting handle portion connected to the tilting stay portion by a cable and operating the tilting stay portion to be in a folded state,
   wherein an end portion of the upper stay rod is fixed to the lower portion of the vehicle cab by an upper bracket, and the upper bracket includes a pulley that rotates so that the cable is wound.

12. A cab tilting stay easy-unlock system, the system comprising:
   a tilting stay portion including an upper stay rod rotatably combined with a vehicle cab, a lower stay rod rotatably combined on an axis to the upper stay rod and rotatably combined with the vehicle body, and a locking handle provided at the upper stay rod and that fixes or unfixes the upper stay rod and the lower stay rod by being combined with the lower stay rod; and
   a tilting handle portion connected to the tilting stay portion by a cable and operating the tilting stay portion to be in a folded state,
   wherein the tilting handle portion includes an unlock handle that is connected to and moves the cable, and a spring providing restoring force to the unlock handle.

13. The system of claim 12, wherein the locking handle is connected to the cable and rotates while pulling the cable.

14. The system of claim 12, wherein the locking handle is separated from the lower stay rod by pulling the unlock handle toward the spring.

* * * * *